(12) United States Patent
DiBiasio et al.

(10) Patent No.: US 7,454,504 B2
(45) Date of Patent: Nov. 18, 2008

(54) RESOURCE SHARING AMONG MULTIPLE RSVP SESSIONS

(75) Inventors: Michael V. DiBiasio, Westford, MA (US); Bruce S. Davie, Belmont, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/584,854

(22) Filed: Oct. 23, 2006

(65) Prior Publication Data

US 2007/0036163 A1    Feb. 15, 2007

Related U.S. Application Data

(60) Division of application No. 10/039,088, filed on Jan. 3, 2002, now Pat. No. 7,143,168, and a continuation-in-part of application No. 09/871,108, filed on May 31, 2001, now Pat. No. 7,281,043.

(51) Int. Cl.
*G06F 15/173* (2006.01)
*H04L 12/28* (2006.01)

(52) U.S. Cl. .................................. 709/226; 370/395.4

(58) Field of Classification Search ................ 709/223, 709/226; 370/395.4
See application file for complete search history.

(56) References Cited

U.S. PATENT DOCUMENTS

| | | | |
|---|---|---|---|
| 6,188,760 B1 | 2/2001 | Oran et al. | |
| 6,282,192 B1 | 8/2001 | Murphy et al. | |
| 6,286,052 B1 | 9/2001 | McCloghrie et al. | |
| 6,295,296 B1 | 9/2001 | Tappan | |
| 6,363,478 B1 | 3/2002 | Lambert et al. | |
| 6,411,705 B2 | 6/2002 | Oran et al. | |
| 6,434,624 B1 | 8/2002 | Gai et al. | |
| 6,449,251 B1 * | 9/2002 | Awadallah et al. | 370/229 |
| 6,487,217 B1 | 11/2002 | Baroudi | |
| 6,493,317 B1 | 12/2002 | Ma | |
| 6,598,077 B2 * | 7/2003 | Primak et al. | 709/219 |
| 6,744,767 B1 | 6/2004 | Chiu et al. | |
| 6,754,181 B1 | 6/2004 | Elliott et al. | |
| 2004/0022237 A1 * | 2/2004 | Elliott et al. | 370/356 |

OTHER PUBLICATIONS http://www.nortelnetworks.com/products/01/m6500/international/i2052_uk.html, Nortel Networks, 2001, pp. 1-2.

(Continued)

*Primary Examiner*—Jason Cardone
*Assistant Examiner*—Tanim Hossain
(74) *Attorney, Agent, or Firm*—Cesari and McKenna LLP

(57) ABSTRACT

In one embodiment, a technique is provided to share resources among data flows. An apparatus receives a request for a new data flow where the new data flow is associated with a session group (ID). The apparatus determines that the session group ID of the new data flow matches a session group ID of one or more existing data flows, and that the one or more existing data flows are not already sharing resources with another data flow that has a session group ID different from the first session group ID. Provided this is true, the apparatus shares resources reserved for the one or more existing data flows with the new data flow.

25 Claims, 12 Drawing Sheets

OTHER PUBLICATIONS

Leite, M., et al., Intel® Internet Phone SDK Enhances Net Phone Quality, Intel® Developer Update Magazine, Sep. 2000, pp. 1-6.

Clark, E., The Resource Reservation Protocol, NetworkMagazine.com, Aug. 2001, pp. 1-4.

Resource Reservation Protocol (RSVP), Cisco Systems Incorporated, San Jose, California, 1992-2002, pp. 43-1-43-12.

Braden, R., et al., The Design of the RSVP Protocol, USC/Information Sciences Institute Final Report, Contract DABT63-01-C-0001, 1993-1995, pp. 1-21.

Jappila, P., RSVP, Nokia Telecommunications, 1999, pp. 1-5.

Zhang, L., et al., RSVP: A New Resource ReSerVaton Protocol, IEEE Network Magazine, 1993, pp. 1-22.

RSVP Soft State Implementation, Cisco Systems Incorporated, San Jose, California, 1988-1997, pp. 1-2.

Welcher, P., Resource Reservation Protocol, RSVP, Mentor Technologies, Feb. 1999, pp. 1-6.

Wroclawski, J., The Use of RSVP with IETF Integrated Services, Internet Engineering Task Force, Request For Comments (RFC) 2210, http://www.ietf.org, Sep. 1997, pp. 1-33.

Braden, R., et al., Resource ReSerVation Protocol (RSVP), Internet Engineering Task Force, Request for Comments (RFC) 2205, http://www.ietf.org, Sep. 1997, pp. 1-112.

Herzog, S., RSVP Extensions for Policy Control, Internet Engineering Task Force, Request for Comments (RFC) 2750, http://www.ietf.org, Jan. 2000, pp. 1-13.

Jappila, Petri; RSVP—Nokia Telecommunications (1999).

RSVP, Cisco Systems Incorporated, 1992-2002.

* cited by examiner

| SESSION GROUP ID | | SOURCE PORT | DESTINATION ADDRESS | DESTINATION PORT | PREVIOUS HOP ADDRESS | SHARED METHOD |
|---|---|---|---|---|---|---|
| SOURCE ADDRESS | RESOURCE ID | | | | | |
| 123.100.106.148 | 42578 | 555 | 111.132.141.168 | 777 | 111.132.139.012 | SGID |
| 123.100.106.148 | 42578 | 555 | 111.132.140.122 | 777 | 111.132.140.012 | SGID |
| 123.100.106.149 | 726 | 555 | 111.132.140.122 | 777 | 111.132.140.012 | |

FIG. 6A

| | SESSION GROUP ID | | SOURCE PORT | DESTINATION ADDRESS | DESTINATION PORT | PREVIOUS HOP ADDRESS | SHARED METHOD |
|---|---|---|---|---|---|---|---|
| SOURCE ADDRESS | RESOURCE ID | | | | | | |
| 123.100.106.148 | 42578 | 555 | 111.132.141.168 | 777 | 111.132.140.012 | SHARED CLASS |
| 123.100.106.149 | 500 | 555 | 111.132.141.168 | 777 | 111.132.140.012 | SHARED CLASS |
| 123.100.106.148 | 42578 | 555 | 111.132.140.122 | 777 | 111.132.139.012 | |

FIG. 6B

RESOURCE SHARING AMONG MULTIPLE RSVP SESSIONS

CROSS-REFERENCE TO RELATED APPLICATIONS

The present application is a continuation-in-part of and commonly assigned U.S. patent application Ser. No. 09/871,108 titled System For Sharing Resources Among RSVP Sessions which was filed on May 31, 2001 and now issued as U.S. Pat. No. 7,281,043, and which application is hereby incorporated by reference as though fully set forth herein The present application is also a divisional of and commonly assigned U.S. patent application Ser. No. 10/039,088, titled Resource Sharing Among Multiple RSVP Sessions, filed on Jan. 3, 2002 and now issued as U.S. Pat. No. 7,143,168.

BACKGROUND OF THE INVENTION

1. Field of the Invention

This invention relates to computer networks and, more specifically to resource sharing among RSVP sessions.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layers 3 and 4 of the OSI Reference Model, which in Transmission Control Protocol/Internet Protocol (TCP/IP) networks corresponds to the IP and the TCP/User Datagram Protocol (TCP/UDP) layers. Data frames at the IP layer include a header which contains an IP source address and an IP destination address, while frames at the TCP/UDP layer include source and destination port numbers. Routers or layer 3 switches may re-assemble or convert received data frames from one LAN standard (e.g., Ethernet) to another (e.g., token ring). Thus, layer 3 devices are often used to interconnect dissimilar subnetworks.

Voice Over IP (VoIP)

Traditionally, computer networks were used to exchange static files or data, such as text and spreadsheet files, while the Public Switched Telephone Network (PSTN) was used to exchange voice information. Computer networks, however, are increasingly being used to transport "voice" information. Voice over IP (VoIP) typically refers to a group of technologies used to transmit voice information over computer networks. Such networks include a plurality of voice agents that convert voice information from its traditional telephony form to a form that is suitable for packet transmission. In other words, the voice agent encodes, compresses and encapsulates the voice information into a plurality of data packets. Examples of voice agents include IP telephones, VoIP gateways, certain private branch exchanges (PBXs), personal computers (PCs) running communication applications, network devices providing voice gateway services, etc. A calling party uses a voice agent to initiate a VoIP call. Once the voice information has been converted into packet format, it is carried by the computer network to a second voice agent configured to serve the called party. Voice traffic, unlike static data files or records, is highly sensitive to delay and to lost packets. That is, delays in receiving data packets carrying voice information at the called party's voice agent can seriously degrade the quality of the call. Accordingly, packets carrying voice information must be delivered to the called party with high probability and in a timely manner.

Computer networks include numerous services and resources for use in forwarding network traffic. For example, different network links, such as Fast Ethernet, Asynchronous Transfer Mode (ATM) channels, SONET links, satellite links, etc., offer different speed and bandwidth capabilities. Particular intermediate devices also include specific resources or services, such as priority queues, filter settings, traffic shapers, queue selection strategies, congestion control algorithms, etc., that affect the rate at which traffic moves through the device and thus across the network. Depending on the selection or allocation of such resources or services, network traffic for different sources and sinks can be forwarded at different speeds or rates, thereby controlling the loss and/or delay experienced by the traffic.

The Resource Reservation Protocol

As set forth above, to support VoIP, packets carrying voice information must typically be delivered within narrow time constraints. Although many computer networks have the resources and services to meet the delivery requirements of VoIP, these resources and services must be allocated, preferably in advance, to the correct network traffic. The Resource reSerVation Protocol (RSVP), which is set forth in Request For Comments (RFC) 2205, is a signaling protocol that was developed so that entities (typically referred to as receivers) could reserve bandwidth within their computer networks to receive a desired data flow, such as a multimedia stream, from one or more sourcing entities.

A data flow is a sequence of messages that have the same source address and same destination address (unicast or multicast). A session is a collection of one or more data flows that have the same unicast or multicast destination address. Sessions differ from data flows in that a session may have multiple senders, whereas a data flow only originates from a single sender.

In a protocol, such as RSVP, resource reservation messages are used to establish a reservation of resources. The RSVP protocol defines two fundamental types of resource reservation messages, the RSVP Path message and the RSVP Resv message.

Pursuant to RSVP, sources send RSVP Path messages identifying themselves and indicating the bandwidth needed to receive their programming or content. These messages proceed hop-by-hop through the intermediate network devices, making those devices aware of the possibility that a reservation of resources may be required. If a receiver is interested in the programming or content offered by a particular source, it responds with a request for resources in the form of a RSVP reservation request (Resv message) which travels hop-by-hop back to the source. At each hop, the corresponding intermediate device establishes a session for the receiver and sets aside sufficient resources to provide the requested bandwidth for the desired data flow. These resources are immediately made available to the data flow. If sufficient resources are not available, the reservation is refused explicitly so that the receiver knows it cannot depend on the corresponding resources being devoted to its traffic. By using RSVP, packets carrying voice information can be accorded the resources and services they need to ensure timely delivery.

Resv messages typically include a set of options that are collectively called the reservation "style." These options are specified in the option vector field of the style object that is included in the Resv message. One option, sharing control, concerns the treatment of reservations for different senders within the same session. This option can be specified to establish a "distinct" reservation for each upstream sender (distinct option) or make a single reservation that is "shared" among all packets of selected senders (shared option). Specifying the shared option enables the new reservation request to share resources that have already been allocated to an existing (prior) reservation. The shared option is typically used for those sessions in which multiple data sources are unlikely to transmit simultaneously.

Another reservation option, sender selection control, controls the selection of senders to the session. This option can be specified to select senders from a list of "explicit" senders (explicit option) or to select senders using a "wildcard" that implicitly selects all senders to the session (wildcard option). The sharing control in combination with the sender selection control imply (specifies) the reservation style associated with the reservation request.

For example, the shared explicit (SE) style is specified by the combination of the shared and explicit options. A SE-style reservation creates a single reservation that is shared among a specific set of senders that are sending data to a given destination. The set (explicit list) of senders are specified using filter spec objects that are included in the Resv message. Likewise, the wildcard-filter (WF) style is specified by the combination of the shared and wildcard options. A WF-style reservation creates a single reservation into which data flows from all upstream senders are mixed. As new senders appear, the reservation is extended to include these new senders.

The sharing control and sender selection control options defined by the RSVP standard provide one technique for sharing resources among RSVP sessions. Another technique that can be used to share resources is described in co-pending and commonly assigned U.S. patent application Ser. No. 09/871,108 titled System Sharing Resources Among RSVP Sessions. This technique uses a session group identifier (SGID) to enable resource sharing between distinct RSVP sessions that originate from a common source (sender) of traffic. Sessions that meet certain criteria defined by the technique are associated with a group that is designated by a SGID. Sessions within the same group share the resources that have been reserved for that group.

Specifically, a sourcing entity generates a locally unique resource identifier. The sourcing entity then uses this resource ID in the signaling to reserve resources for a first session. The sourcing entity may then decide to have these resources shared with a second session by reusing this same resource ID in the signaling to reserve resources associated with the second session. When the second session is being created, intermediate devices are configured to recognize that a reservation associated with this resource ID already exists. The intermediate devices are further configured to share the previously reserved resources between the first and second sessions, rather than reserve additional or further resources for the second session.

One problem that arises in networks that use both a shared class method, such as the SE-style or the WF-style, and the SGID method to share resources is that the rules for how the resources may be shared are not adequately defined. For example, resource sharing using the shared class method shares resources between data flows that have the same destination but different sources. On the other hand, resource sharing using the SGID method shares resources between data flows that have the same source but different destinations. A conflict may arise when both techniques are used in the same system to share resources because resources allocated using one technique may appear to be shareable to the other technique when in fact they are not.

A technique is needed that would enable resources to be shared yet, correctly allocated in all cases.

SUMMARY OF THE INVENTION

Briefly, the present invention relates to a technique for correctly allocating shared resources among RSVP sessions while taking maximal advantage of resource sharing opportunities. In accordance with the present invention, resources are shared if one of two of the following rules for sharing is satisfied:

1) a new request for resources is for the same session as an existing request and both the existing request and new request were made using a reservation style that implies the shared option and the existing request is not sharing resources with a different session that has the same session group identifier (SGID) as the existing request; or
2) the SGID associated with the new request is the same as the SGID associated with an existing reservation and the existing reservation is not sharing resources with another data flow that is associated with a different SGID.

BRIEF DESCRIPTION OF THE DRAWINGS

The invention description below refers to the accompanying drawings, of which:

FIGS. 6A and 6B are highly schematic illustrations of a data structure used in accordance with the present invention.

DETAILED DESCRIPTION OF AN ILLUSTRATIVE EMBODIMENT

Figure 1:
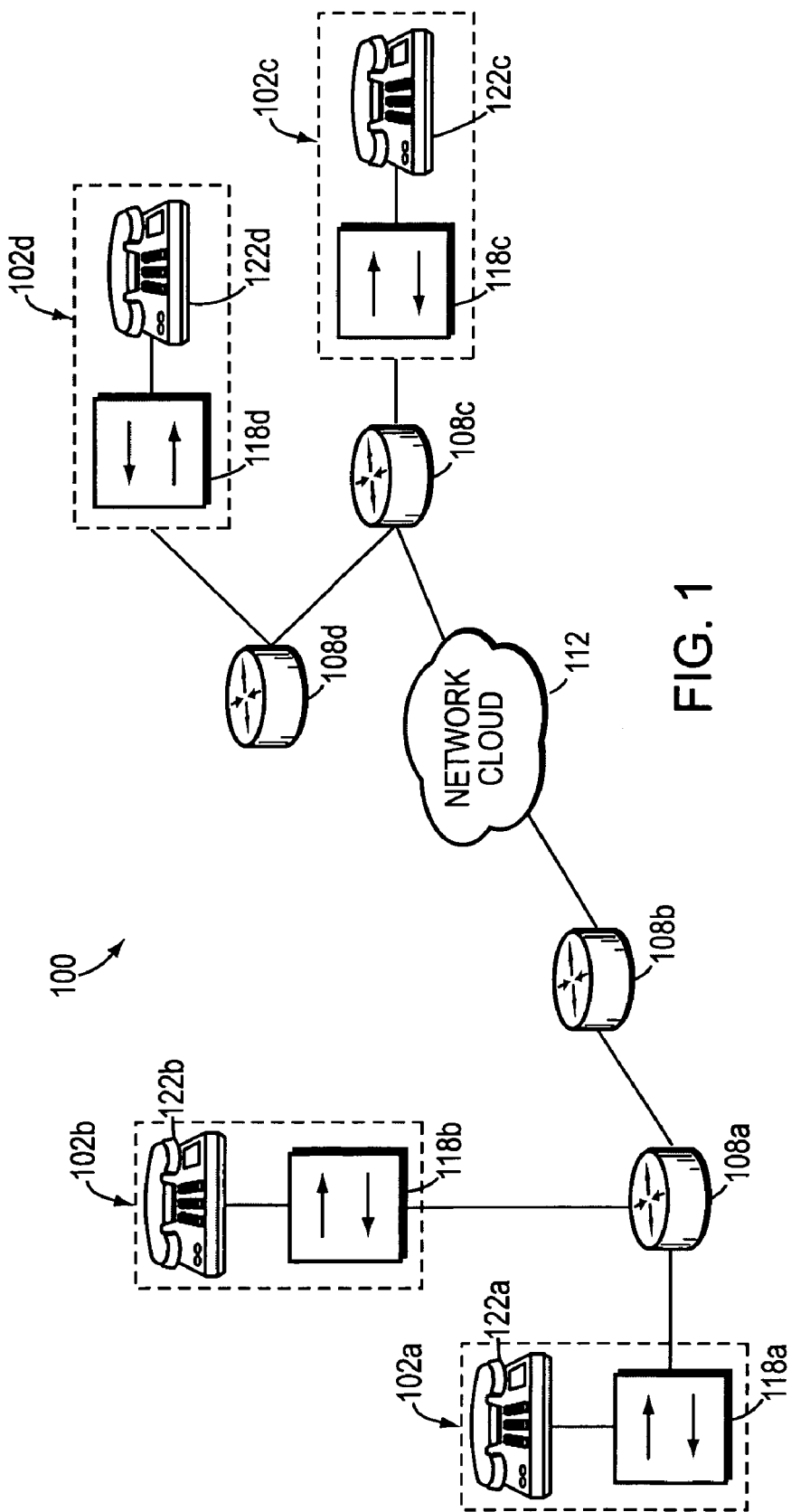
FIG. 1 is a highly schematic diagram of a computer network that can implement the present invention.

FIG. 1 is a highly schematic diagram of a typical computer network 100 that can implement the present invention. The network 100 includes voice agents 102a, 102b, 102c and 102d that are interconnected by a plurality of intermediate network devices. More specifically, voice agents 102a and 102b are coupled to a first-hop device, such as router 108a, which, in turn, is coupled to a second device, such as router 108b. Router 108b, in turn, is coupled to a network cloud 112. The network cloud 112 may consist of a plurality of network devices, local area networks (LANs), and end stations. Voice agent 102d is coupled to a first-hop device, such as router 108d, which is coupled to router 108c. Router 108c, in turn, is coupled to network cloud 112. Voice agent 102c is coupled to a first-hop device, such as router 108c.

In the illustrative embodiment, voice agents 102a-d comprise network devices 118a-d that have been configured to provide VoIP gateway support to other devices or entities, such as conventional analog telephone sets 122a-d, coupled thereto. Suitable VoIP gateway devices include the 3600 series of routers from Cisco Systems, Inc. of San Jose, Calif.

Figure 2:
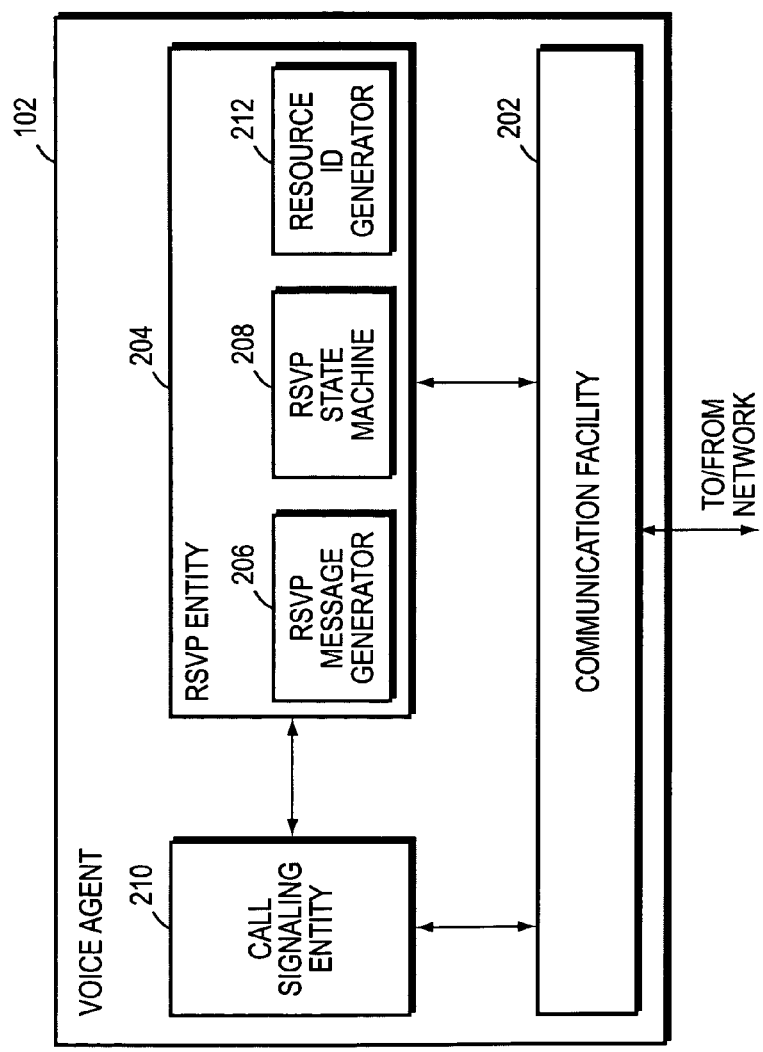
FIG. 2 is a highly schematic, partial block diagram of a voice agent that can implement the present invention.

FIG. 2 is a highly schematic, partial block diagram of a voice agent, such as voice agents 102a-d (FIG. 1). Voice agent 102, more specifically device 118, preferably includes a communication facility 202 and one or more resource reservation components, such as a Resource reSerVation Protocol (RSVP) entity or engine 204. The RSVP entity 204, moreover, includes a RSVP message generator 206 and a RSVP state machine engine 208. RSVP entity 204 operates, except as described herein, in accordance with the RSVP specification standard, which is set forth in RFC 2205 and is hereby incorporated by reference in its entirety. Voice agent 102 further includes a call signaling entity 210 in communicating relationship with the RSVP entity 204 and the communication facility 202. Entity 210 operates in accordance with a signaling protocol, such as H.323, Session Initiation Protocol (SIP), Media Gateway Control Protocol (MGCP) or MEGACO, which is an alternative to MGCP.

The RSVP entity 204 is also in communicating relationship with the communication facility 202, and can thus exchange information, including network packets and frames with facility 202. In accordance with the present invention, RSVP entity 204 further includes a resource identifier (ID) generator 212. As described below, resource ID generator 212 is configured to generate IDs for use by the RSVP entity 204 in reserving resources within computer network 100 (FIG. 1).

The communication facility 202 preferably includes one or more software libraries for implementing a communication protocol stack allowing a voice agent, such as 102a to exchange messages with other entities of network 100, such as voice agents 102b, 102c and 102d. The communication facility 202 may, for example, include software layers corresponding to the Transmission Control Protocol/Internet Protocol (TCP/IP) communication stack, although other communication protocols, such as Asynchronous Transfer Mode (ATM) cells, the Internet Packet Exchange (IPX) protocol, the AppleTalk protocol, the DECNet protocol and/or NetBIOS Extended User Interface (NetBEUI) could be utilized. Communication facility 202 further includes transmitting and receiving circuitry and components, including one or more network interface cards (NICs) that establish one or more physical ports for exchanging data packets and frames with a network entity to which it is connected, such as router 108.

In accordance with the preferred embodiment, voice agent 102 includes programmable processing elements (not shown), which may contain software program instructions pertaining to the methods of the present invention. Other computer readable media may also be used to store the program instructions of the present invention.

Figure 3:
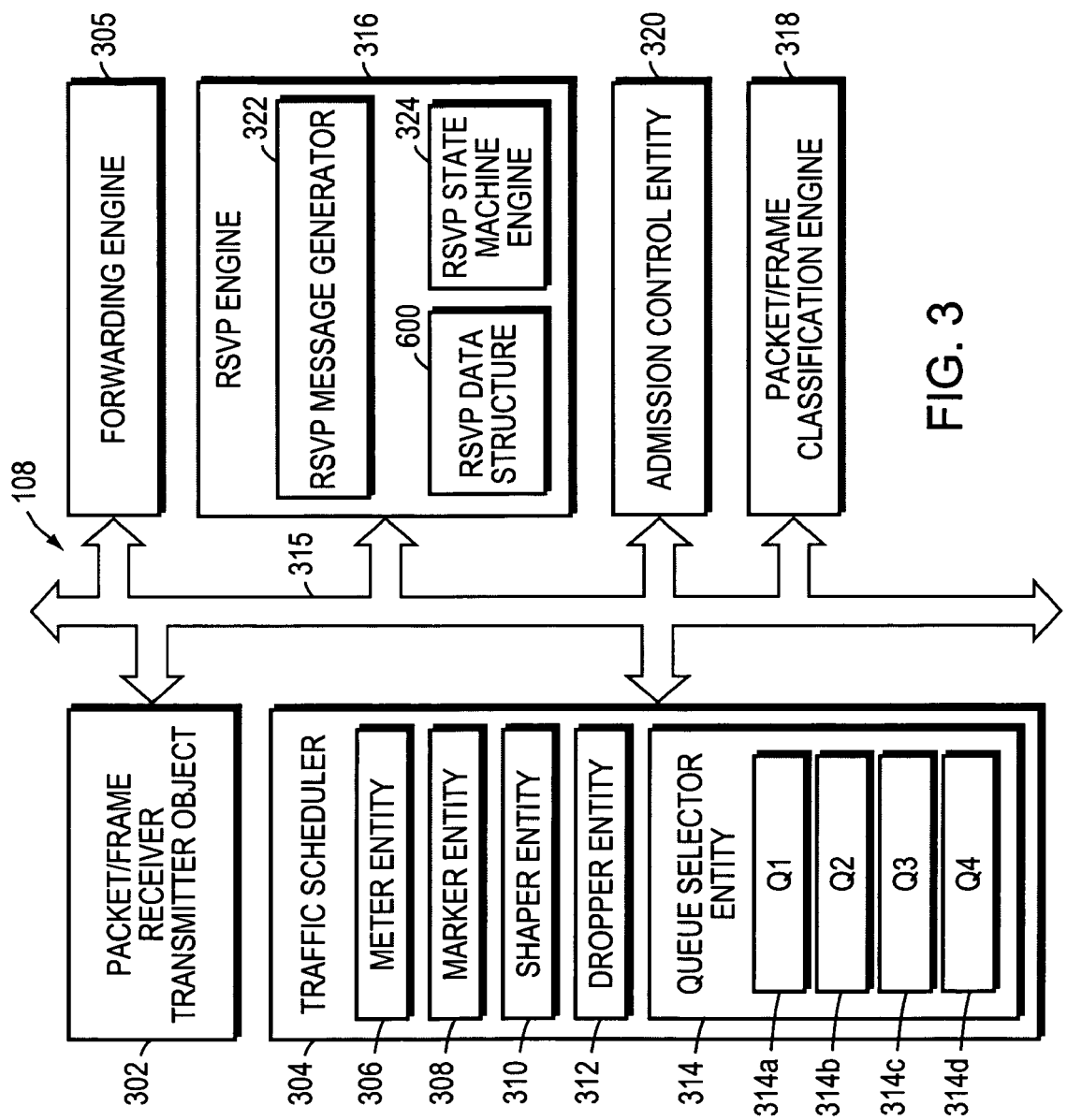
FIG. 3 is a highly schematic, partial block diagram of an intermediate network device that can implement the present invention.

FIG. 3 is a highly schematic, partial, functional block diagram of an intermediate network device in accordance with the present invention, such as router 108. Router 108 preferably includes one or more packet/frame receiver transmitter objects 302, a traffic scheduler 304, and a forwarding engine 305. The packet/frame receiver transmitter object 302 is preferably configured to provide one or more interfaces or ports for receiving and sending network messages by router 108. The traffic scheduler 304 includes a plurality of resources or services that are used by router 108 to forward packets. For example, scheduler 304 may include one or more metering entities 306, one or more marker entities 308, one or more shaper entities 310, one or more dropper entities 312, and one or more queue selector entities 314. The queue selector entity 314, moreover, includes or has access to a plurality of queues 314a-d which buffer packets for the interfaces and/or ports that have been configured at router 108. The packet/frame receiver transmitter object 302, the traffic scheduler 304, and forwarding engine 305 are in communicating relationship with each other via one or more communication paths or bus structures, such as system bus 315, so that network messages, as well as commands may be exchanged between them.

Router 108 further includes one or more resource allocation and reservation components. In the preferred embodiment, router 108 includes a RSVP entity or engine 316, a packet/frame classification engine 318, and an admission control entity 320. The RSVP engine 316, moreover, includes a RSVP message generator 322, a RSVP state machine engine 324 and a data structure 600 for storing RSVP information. RSVP engine 316 similarly operates, except as described herein, in accordance with the RFC 2205 specification standard. Router 108 also includes programmable processing elements (not shown), which may contain software program instructions pertaining to the methods of the present invention. Other computer readable media may also be used to store the program instructions of the present invention.

A suitable platform for router 108 is the 7200 or 4700 series of routers from Cisco Systems, Inc. Nonetheless, those skilled in the art will recognize that the present invention, or parts thereof, may be implemented in other network devices and/or entities, such as switches, router-switches, bridges, repeaters, servers, etc.

Figure 4A:
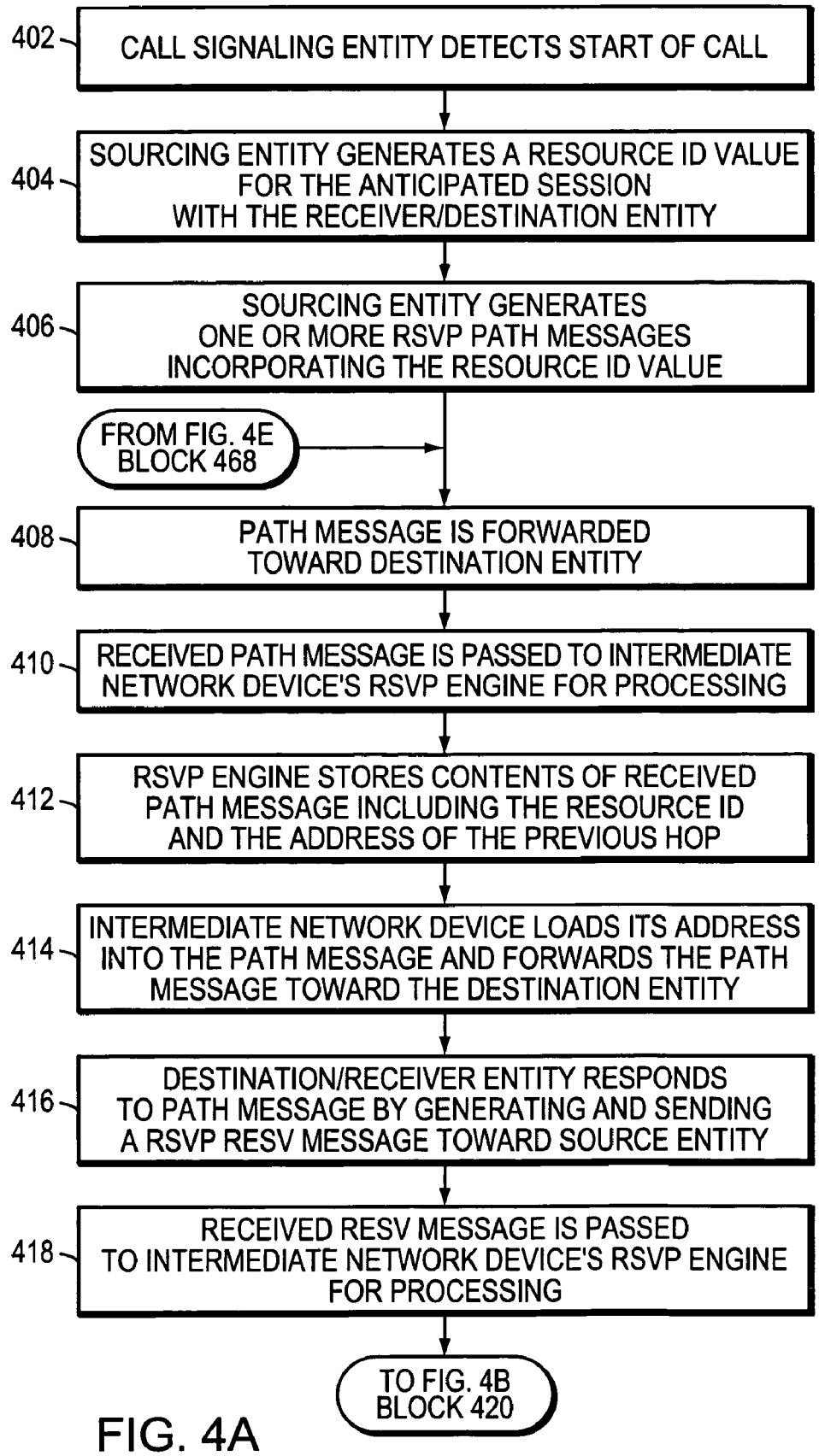
FIGS. 4A-E are a flow diagram of a method that can be used to implement the present invention.

FIGS. 4A-E are a flow diagram of a method that can be used to implement the present invention. Suppose, for example, that a first party utilizes voice agent 102a (FIG. 1) to place a call to a second party at voice agent 102d. The first party may dial a series of numbers at the analog telephone set 122a that correspond to voice agent 102d. To insure that the anticipated voice traffic from voice agent 102a is forwarded through the computer network 100 in a timely manner, i.e., with minimal delay, voice agent 102a (in cooperation with agent 102d as described below) preferably causes sufficient resources to be reserved across the computer network 100 to meet the time constraints of voice traffic. Preferably, the call signaling entity 210 at device 118a detects the start of a call from telephone set 122a to voice agent 102d, as indicated at block 402 (FIG. 4A).

In response, voice agent 102a generates a locally unique resource ID value, e.g., "42578", for use with the reservation of network resources about to be made for the session with voice agent 102d, as indicated at block 404. In this context, "locally unique" means that the chosen resource ID value is not currently in use by voice agent 102a for any other call. Call signaling entity 210 may, for example, issue one or more Application Programming Interface (API) system calls to RSVP entity 204 causing it to have the resource ID generator 212 produce a resource ID value. The resource ID generator 212 may be configured as a random number generator for producing 32-bit strings. The RSVP message generator 206 then formulates one or more RSVP Path messages that incorporate the generated resource ID value, as indicated at block 406. Another API system call may be used by the call signaling entity 210 to direct the RSVP entity 204 to generate the Path message.

Figure 5A:
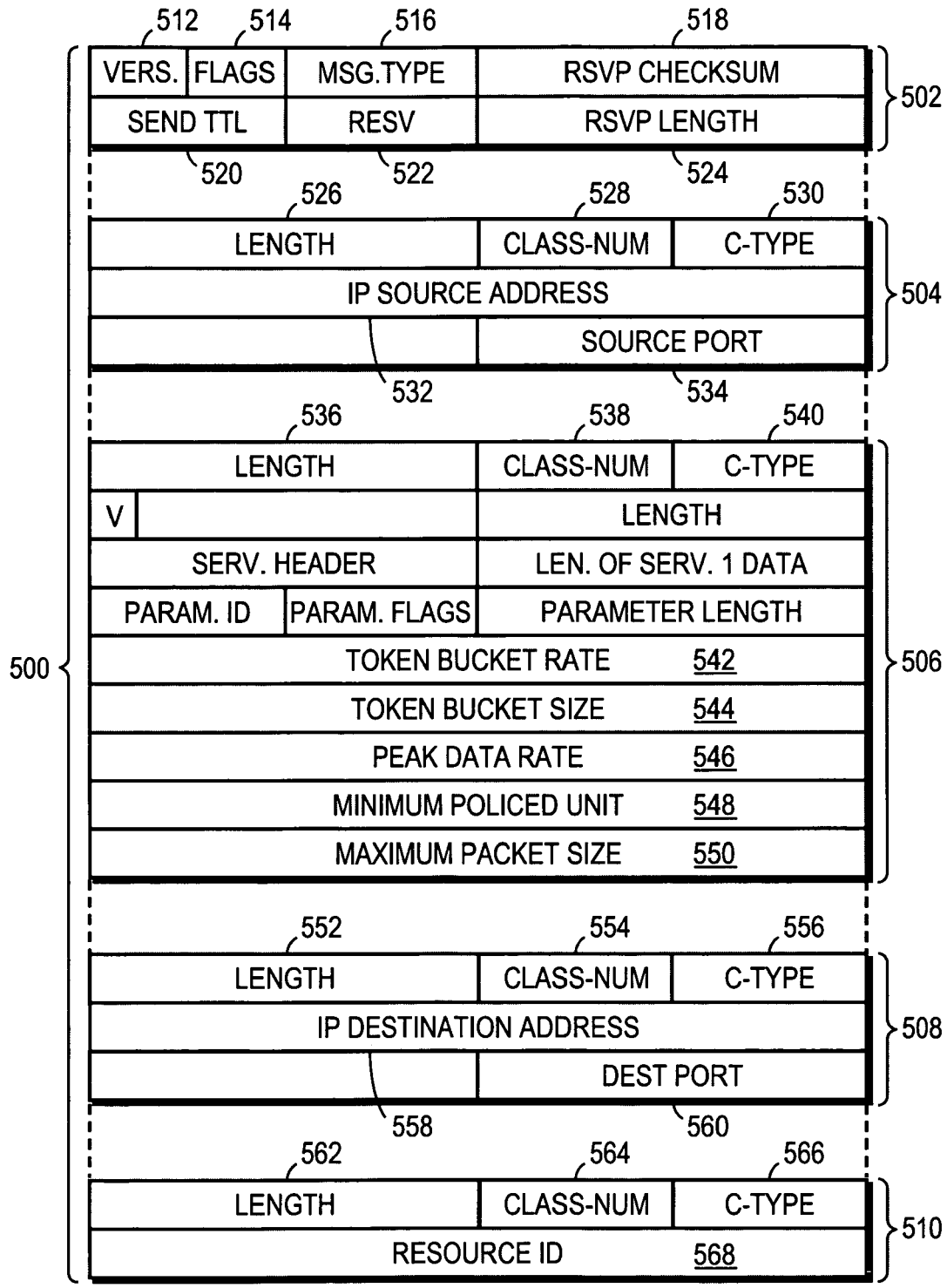
FIG. 5A is a highly schematic diagram of a Path message in accordance with the present invention.

FIG. 5A is a schematic block diagram of a Path message 500 in accordance with the present invention. The Path message 500 includes a header 502, a sender Template object 504, a sender Tspec object 506, a session object 508 and a resource ID object 510, each of which has a plurality of fields. In particular, the header 502 has a version field 512, a flags field 514, a message type field 516, a RSVP checksum field 518, a Send Time To Live (TTL) field 520, a reserved field 522 and a RSVP length field 524. The sender Template object 504 has a length field 526 (loaded with the length of the respective object), a class number field (C-Num) 528 and a class type (C-type) field 530. It further includes an IP source address (SA) field 532, a source port number field 534 and may include one or more un-used fields.

The sender Tspec object 506 includes length field 536, class number and class type fields 538, 540. It further includes a token bucket rate field 542, a token bucket size field 544, a peak data rate field 546, a minimum policed unit field 548 and a maximum packet size field 550, among others. The session object 508 includes length, class number and class type fields 552, 554, 556. It further includes IP destination address (DA) and destination port fields 558, 560. The resource ID object 510 includes length, class number and class type fields 562, 564, 566. It further includes a resource ID field 568.

Message generator 206 loads header 502, sender Template object 504, sender Tspec object 506, and session object 508 in a conventional manner. In particular, it loads the IP SA and source port fields 532, 534 with the IP address and Transmission Control Protocol/User Datagram Protocol (TCP/UDP) port being utilized by voice agent 102a. It similarly loads the IP DA and destination port fields 558, 560 with the IP address and TCP/UDP port (if known) for voice agent 102d. Message generator 206 loads the sender Tspec object 506 with values corresponding to the network resources, e.g., the bandwidth, that voice agent 102a believes will be required to support the anticipated traffic flow to voice agent 102d.

The value generated by the resource ID generator 212, i.e., "42578", is loaded into the resource ID field 568 of the resource ID object 510. Class number and class type fields 564, 566 of object 510 are preferably loaded with preselected values which suitably configured network devices and entities recognize as indicating that object 510 carries a resource ID for use as described herein.

It should be understood that Path message 500 may include other objects, such as an adspec object carrying parameters that may be used to characterize the path taken by the traffic flow or session.

The RSVP entity 204 then passes the Path message 500 to the voice agent's communication facility 202 for transmission toward voice agent 102d via network 100, as indicated at block 408. The Path message 500 is first received at router 108a. The packet/frame receiver transmitter object 302 of router 108a recognizes the received message as an RSVP Path message and, accordingly, passes it to the RSVP engine 316 for processing, as indicated at block 410. The RSVP engine 316 stores the contents of the Path message 500 in data structure 600, as indicated at block 412.

FIGS. 6A and 6B are highly schematic illustrations of data structure 600 configured as a table or array. Table 600 includes a plurality of columns 602-616 and rows 626 whose intersections define corresponding records or cells of the table. Specifically, table 600 includes a source address (SA) column 602, a resource ID column 604, a source port column 606, a destination address (DA) column 608, a destination port column 610, a previous hop address column 612 and a shared column 616. As described below, the SA and resource ID columns 602, 604 can be logically combined to form a session group ID, as indicated by column 614. The shared column 616 preferably indicates whether a session is sharing resources using the SGID method or shared class method. Each row 626 of table 600 preferably corresponds to a respective RSVP data flow.

It should be understood that data structure 600 may include additional information, such as whether or not resources have been reserved for the respective data flows, the reserved bandwidth, protocol, etc.

RSVP engine 316 first establishes a new row or entry 626a (FIG. 6A) for the data flow with voice agent 102d. The RSVP engine 316 then populates the cells or records of this entry 626a with the contents of the received Path message 500. For example, RSVP engine 316 loads the source address and source port from fields 532, 534 into the cells of table entry 626a that correspond to columns 602, 606. It loads the destination address and destination port from fields 558, 560 into the cells that correspond to columns 608, 610. It loads the address of the previous hop node into the cell corresponding to column 612, and it loads the resource ID value from field 568, i.e., "42578", into the cell corresponding to column 604.

Router 108a then loads its IP address into a previous hop object (not shown) that it adds to the Path message 500 and forwards the message 500 toward voice agent 102d, as indicated at block 414 (FIG. 4A). Router 108a may consult a routing table (not shown) to determine the interface from which the Path message 500 is to be forwarded. At each hop along the route to voice agent 102d, the respective intermediate network device 108 processes the Path message in the same manner as described above. In particular, each device stores the information contained in the Path message 500 in its table 600. Each intermediate device 108 also loads its IP address into the previous hop object before forwarding the Path message 500 to the next intermediate network device along the route. Thus, when the Path message 500 reaches its destination (e.g., voice agent 102d), each intermediate network device 108 along the route from the sourcing entity will have stored the address of the previous hop along that route so that it will be able to forward messages back to the sourcing entity along the same route used by the Path message 500.

Voice agent 102d preferably responds to the Path message 500 by generating one or more RSVP Reservation (Resv) messages and sending these messages toward the source entity, as indicated at block 416 (FIG. 4A). More specifically, the communication facility 202 of voice agent 102d recognizes the message as a Path message and sends it to the RSVP entity 204 for further processing.

Figure 5B:
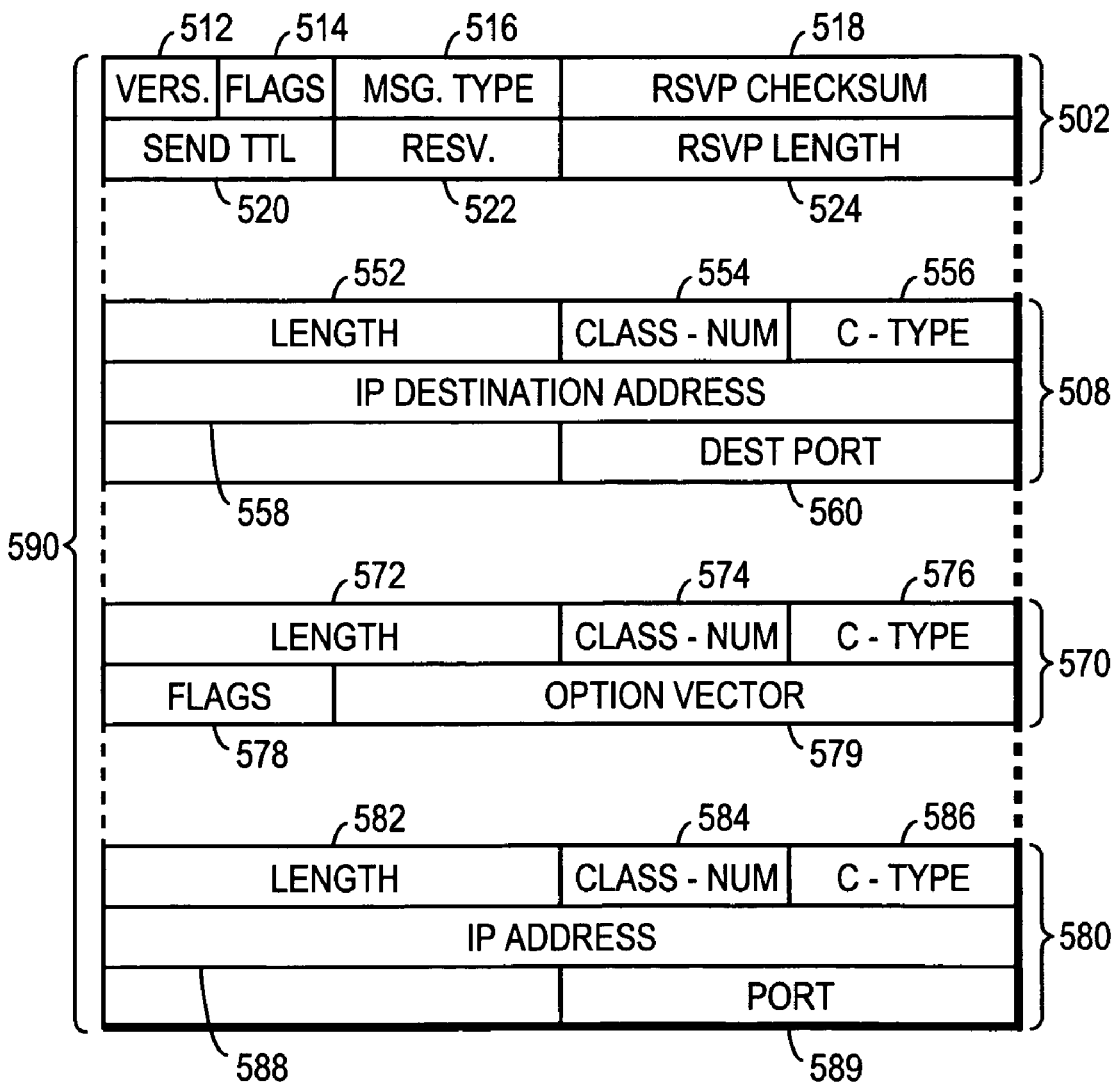
FIG. 5B is a highly schematic diagram of a Resv message that can be used with the present invention.

FIG. 5B is a schematic block diagram of a Resv message 590 that can be used with the present invention. The Resv message 590 includes, among other things, a header object 502, a session object 508, a style object 570, and optionally a filter spec object 580. The header 502 and session object 508 hold information that is similar to the information held by the header 502 and session object 508 of the Path message 500. The style object 570 specifies a set of options that in accordance with RFC 2205 implies the reservation style, e.g., distinct, WF style, SE style. The filter spec object 580 is used to specify the source address and port of a sender that comprises the explicit list of senders associated with an explicit style, e.g., SE style.

The RSVP entity 204 loads the header object 502 and session object 508 in a conventional manner. More specifically, the RSVP entity 204 loads the source address 532 and source port 534 information contained in the Path message 500 into the destination address 558 and destination port 560 fields of the Resv message 590. Further, the RSVP entity 204 of the receiver, voice agent 102d, determines if the call signaling entity 210 desires to share resources using the SE style or WF style and if so, sets the appropriate values in the option vector field 579 to select the desired sharing style accordingly. In addition if the SE style is selected, filter spec objects 580 are added to represent each data flow in the RSVP session. Assuming the RSVP entity 204 concludes that sharing is not appropriate, sharing is not specified in the option vector field 579 of the style object 570.

The Resv message 590 travels hop-by-hop back to voice agent 102a following the same route used by the Path message 500. At each hop, the Resv message from voice agent 102d is processed by the respective intermediate network device 108. More specifically, the Resv message is initially received at router 108d. The packet/frame receiver transmitter object 302 of router 108d recognizes the received message as a Resv message and, accordingly, passes it to the RSVP engine 316 for processing, as indicated at block 418.

Figure 4B:
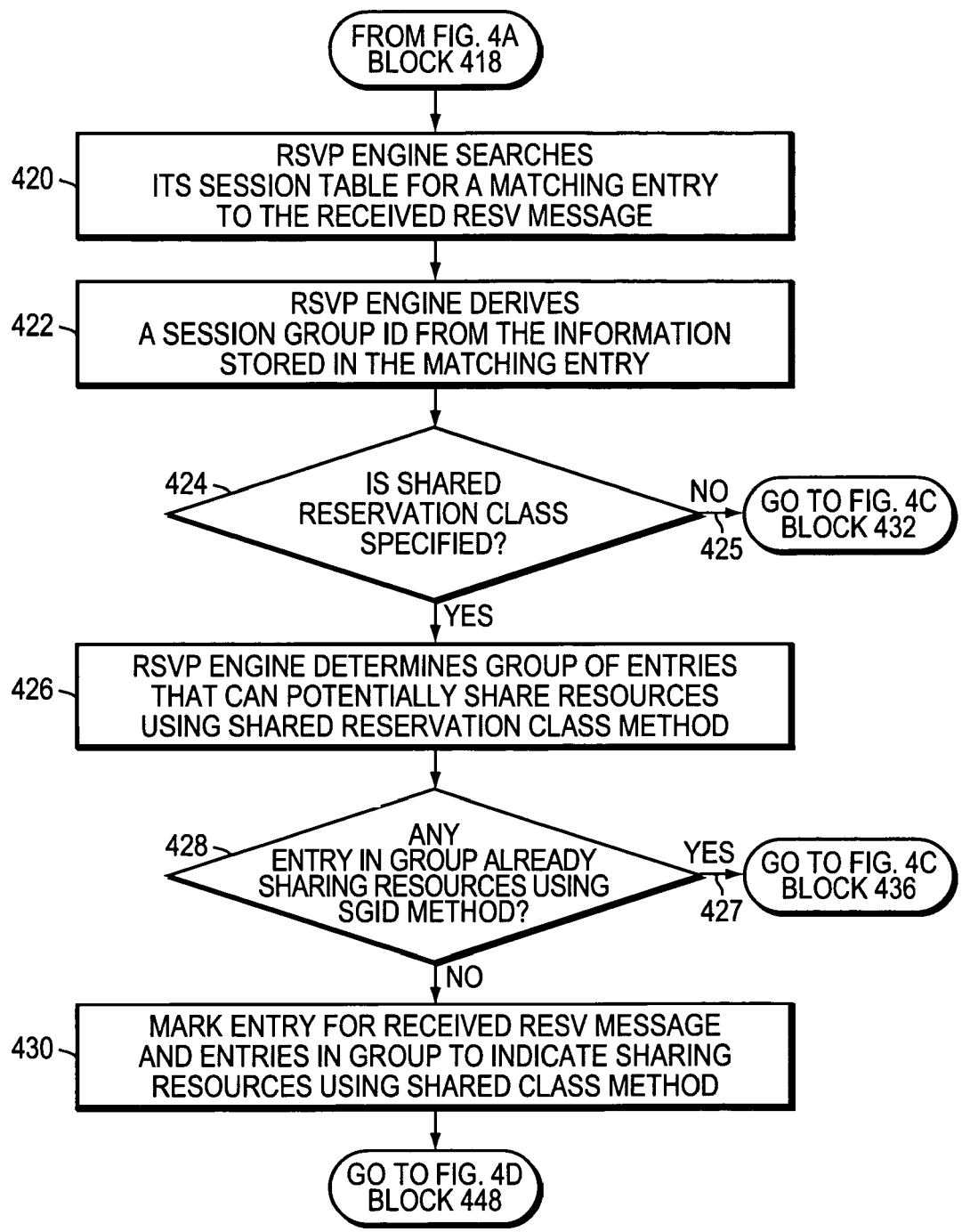

The RSVP engine 316 first searches its RSVP session table 600 to identify the matching entry 626a for this Resv message, as indicated at block 420 (FIG. 4B). In particular, the RSVP engine 316 looks for an entry of table 600 whose source address, source port, destination address and destination port match those contained in the received Resv message. As described above, a separate entry 626 of table 600 is established for each data flow.

Upon locating the matching entry 626a, the RSVP engine 316 derives or computes a logical session group ID for this reservation request by concatenating the source address with the resource ID value from the cells corresponding to columns 602 and 604 of the matching entry, as indicated at block 422.

Figure 4C:
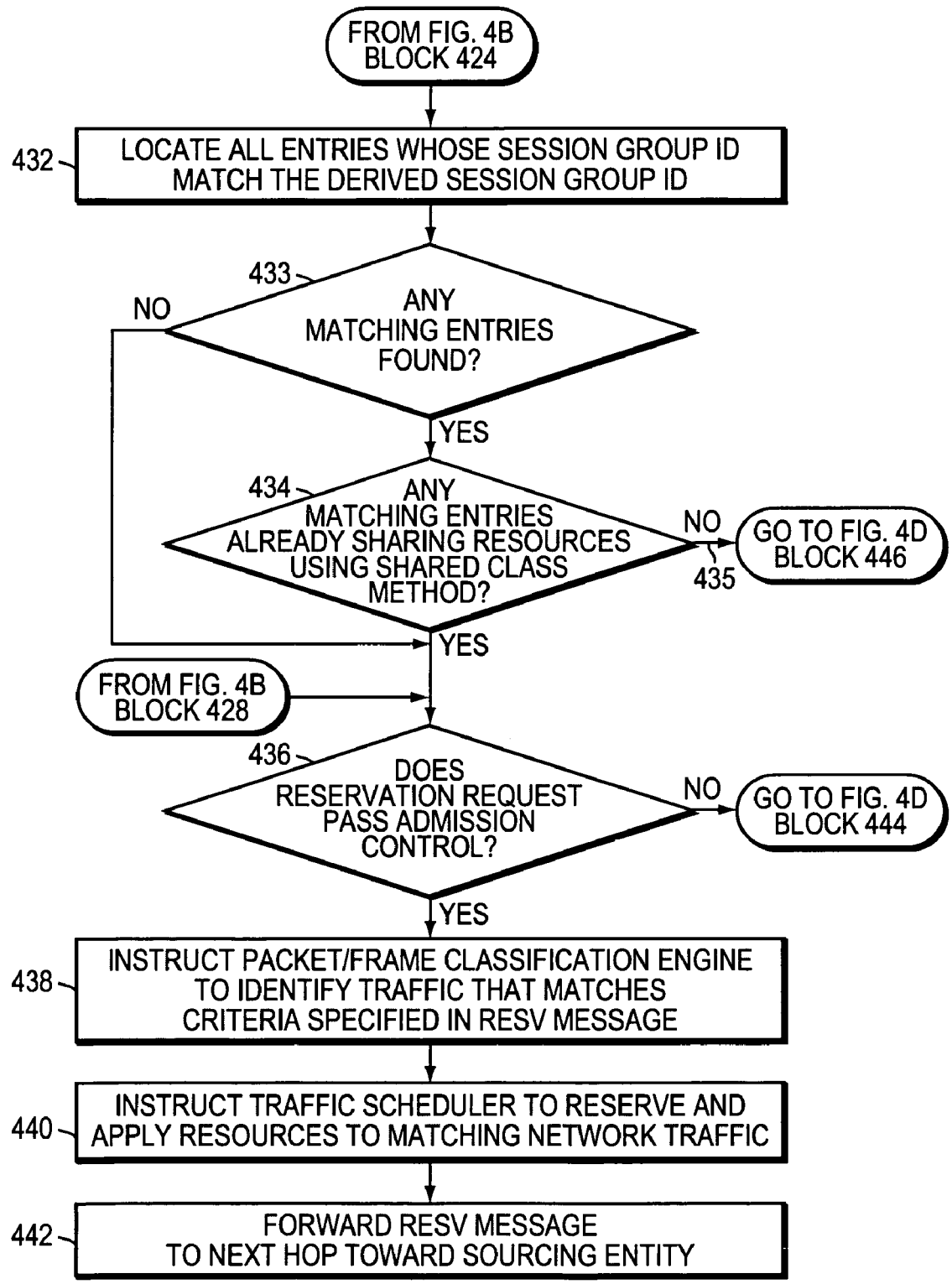

At decision block 424, the RSVP engine 316 determines if a shared reservation class is specified in the Resv message 590, i.e., does the Resv message contain a style object 570 that specifies a SE or WF style. Since sharing was not specified in the style object 570 of the Resv message, as stated above, the RSVP engine 316 follows NO arrow 425 and proceeds to block 432 (FIG. 4C).

At block 432, the RSVP engine 316 searches the table 600 and locates all other entries in the table whose session group identifier (SGID) 614 matches the SGID that was derived from the matching entry at step 422. At decision block 433, the RSVP engine 316 determines if any additional matching entries were found. Assuming no additional matching entries were found, the RSVP engine 316 follows the NO arrow to block 436.

At decision block 436, the RSVP engine 316 performs admission control on the reservation request. More specifically, using the contents of the Tspec object 506, the RSVP engine 316, queries admission control entity 320 to determine whether router 108d has sufficient available resources to support the requested reservation. RSVP engine 316 may also determine whether or not the party making the reservation e.g., voice agent 102d, has administrative permission to make the reservation specified in the RSVP Resv message.

Assuming the reservation represented by the received Resv message 590 passes admission control, the RSVP engine 316 then instructs the packet/frame classification engine 318 to identify received traffic, i.e., packets, matching the criteria contained in the Resv message, such as the filter spec and session spec objects, as indicated at block 438, and directs the traffic scheduler 304 to apply the necessary resources to received traffic matching that criteria to meet the bandwidth requirements contained in the Resv message, as indicated at block 440. In other words, the RSVP engine 316 reserves sufficient resources to support the timing requirements of the session from voice agent 102a to voice agent 102d.

Figure 4D:
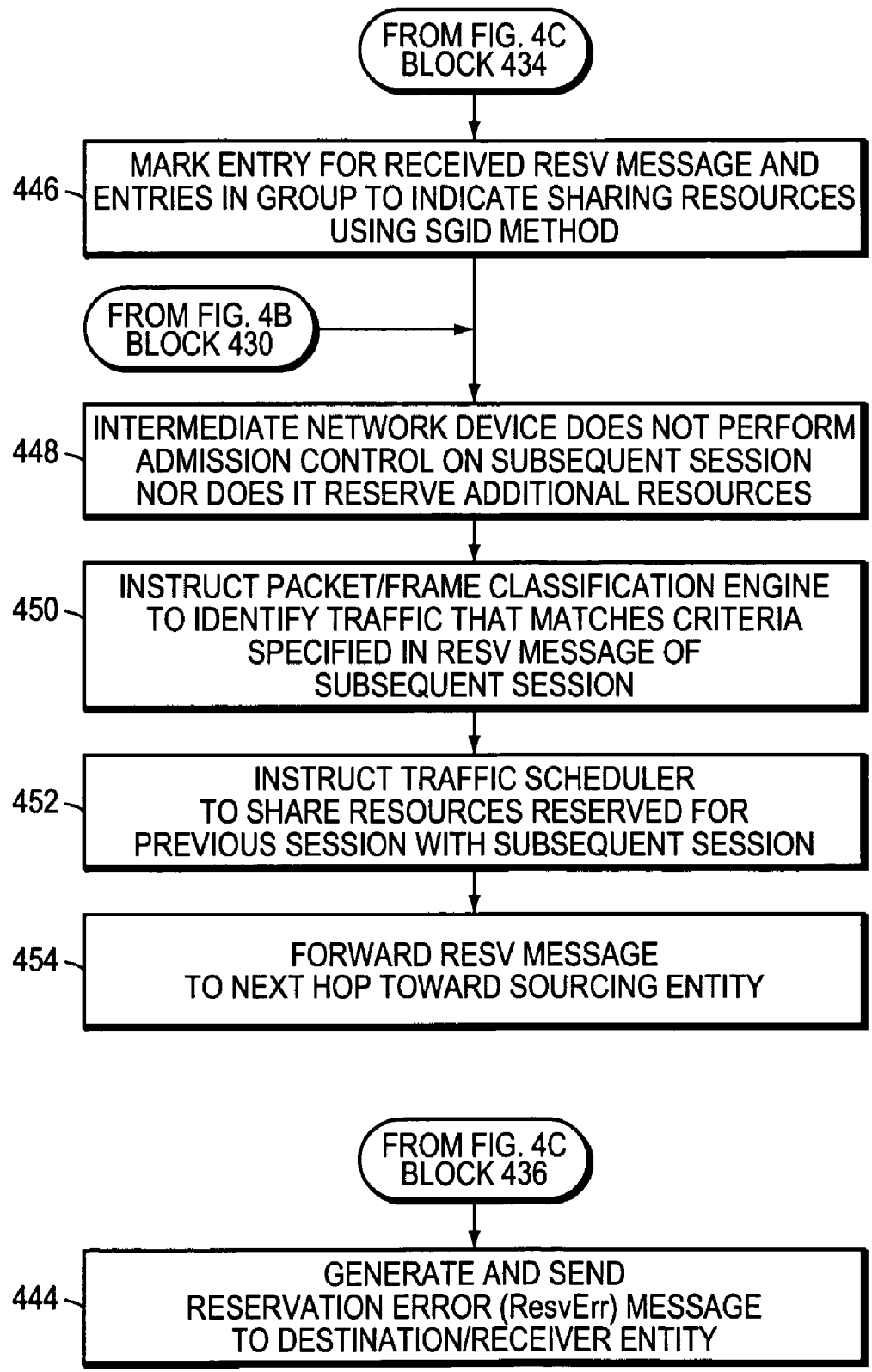

Using the stored previous hop address from the matching entry 626a of its table 600, intermediate device 108d then forwards the Resv message to the next hop toward the sourcing entity, i.e., toward voice agent 102a, as indicated at block 442. If in response to decision block 436, the reservation fails admission control, the RSVP message generator 322 formulates a reservation error (ResvErr) message and sends it back toward the destination/receiving entity, i.e., voice agent 102d, as indicated at block 444 (FIG. 4D).

The above described processing of the Resv message is preferably repeated at each intermediate device 108 along the route from voice agent 102d to voice agent 102a.

At this point resources are reserved along the entire route from voice agent 102a to voice agent 102d (e.g., at routers 108a, 108b, 108c and 108d) to support the data (traffic) flow containing voice information from voice agent 102a to voice agent 102d. It should be understood that a similar reservation of resources is made in the opposite direction. That is, voice agent 102d preferably sends one or more Path messages to voice agent 102a, and voice agent 102a responds with one or more Resv messages.

Figure 4E:
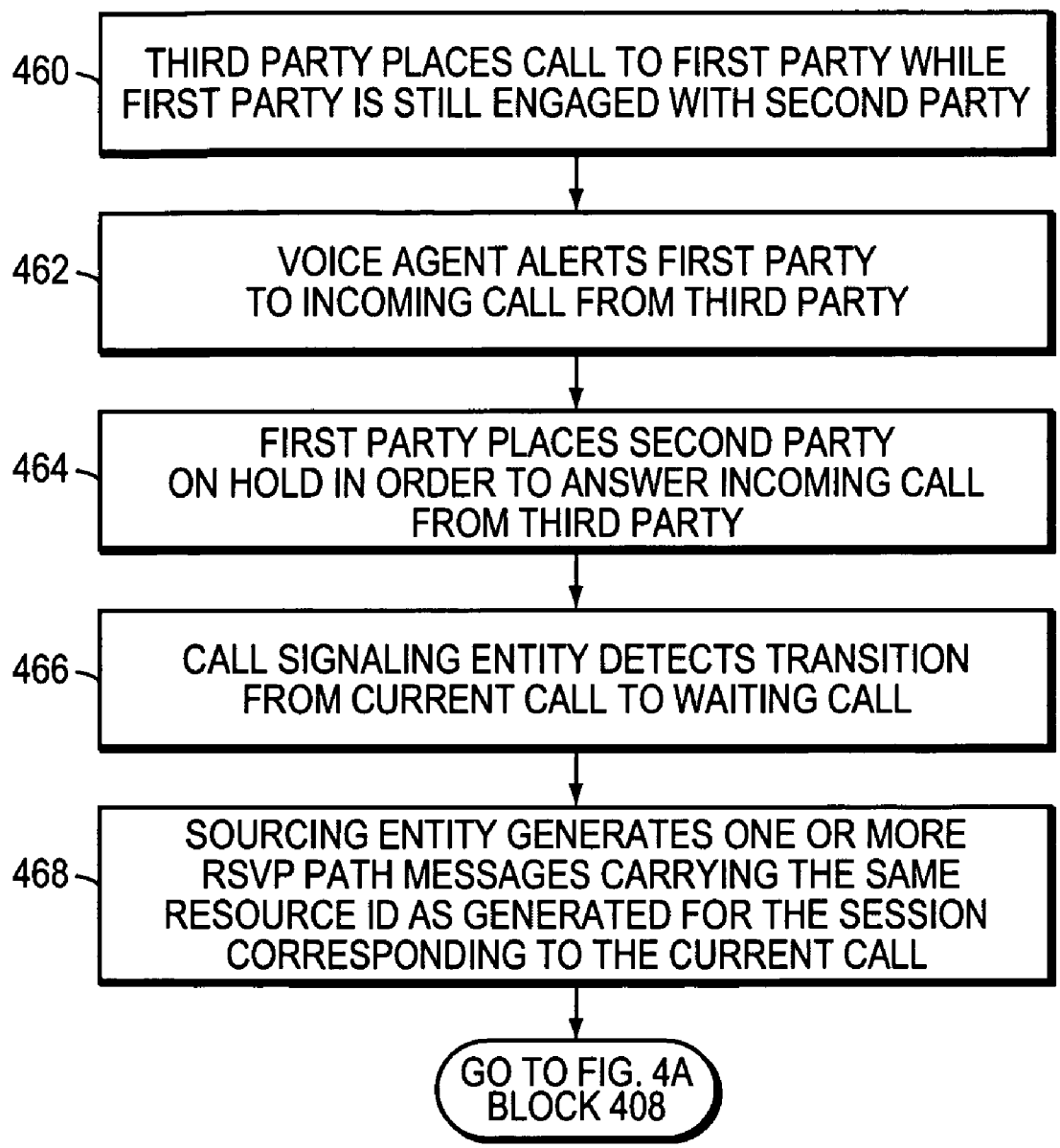

Suppose that while the first party at voice agent 102a is talking to the second party at voice agent 102d, a third party at voice agent 102c places a call to the first party, as indicated at block 460 (FIG. 4E). The call signaling entity 210 at voice agent 102a, at block 462, preferably alerts the first party of the incoming call. Suppose further that voice agent 102a supports call waiting and that the first party 102a decides to place the second party 102d on hold and answer the call from the third party 102c, as indicated at block 464. Call signaling entity 210, at block 466, detects the first party's transition from the second party, i.e., from voice agent 102d, to the third party, i.e., to voice agent 102c. To support the anticipated flow of voice traffic from the first party 102a to the third party 102c, which represents a new session, the call signaling entity 210 at voice agent 102a directs the RSVP entity 204 to ensure that sufficient network resources are made available to support this new traffic flow.

More specifically, call signaling entity 210 directs the RSVP entity 204 to generate and transmit one or more Path messages to voice agent 102c, as indicated at block 468. However, because the first party will, at any given instant, only be sending voice traffic to voice agent 102c or, if he or she switches back to the first call, to voice agent 102d, the call signaling entity 210 concludes that the network resources reserved for the session to voice agent 102d may be shared with the anticipated session to voice agent 102c. Accordingly, the call signaling entity 210 directs the RSVP entity 204 to configure the reservation request such that the previously reserved network resources are shared with the anticipated session to voice agent 102d. In particular, call signaling entity 210 directs RSVP entity 204 to re-use the same resource ID, i.e., "42578", that was established for the traffic flow to voice agent 102d in the Path message to be transmitted to voice agent 102c, as also indicated at block 468.

In response, the message generator 206 of RSVP entity 204 creates one or more Path messages 500. In fields 558, 560 of the session object 508, the RSVP entity 204 loads the IP address and port number for voice agent 102c. In the resource ID field 568 of object 510, the RSVP entity 204 loads the same value, i.e., "42578", used in the Path message 500 that was sent to voice agent 102d as described above. RSVP entity 204 then passes the Path message 500 to communication facility 202 for transmission to voice agent 102c via network 100, as indicated by block 468 which returns processing to block 408 (FIG. 4A).

As indicated by blocks 410-414 (FIG. 4A), at each hop along the route to voice agent 102c, the respective intermediate network device 108 processes the Path message.

In particular, each device 108 creates a new entry 626b, in its RSVP session table 600 and stores the information contained in the Path message 500 in that new entry. Each intermediate device 108 also loads its IP address into the previous hop object before forwarding it to the next intermediate network device along the route.

Voice agent 102c preferably responds to the Path message 500 from voice agent 102a by generating one or more RSVP Resv messages 590, as indicated at block 416. The RSVP entity 204 loads the header object 502 and session object 508 in a conventional manner as described above. Further, the RSVP entity 204 determines if it can share resources using the SE style or WF style and if so, specifies sharing by setting the appropriate values in the option vector field 579 to select the desired sharing style accordingly. Assuming the RSVP entity 204 concludes that resources cannot be shared, sharing is not specified in the option vector field 579 of the style object 570.

The Resv message 590 travels hop-by-hop back to voice agent 102a following the same route used by the Path message 500 that traveled from voice agent 102a to voice agent 102c. At each hop, the Resv message from voice agent 102c is processed by the respective intermediate network device 108. More specifically, the Resv message is initially received at intermediate network device 108c. The packet/frame receiver transmitter object 302 of intermediate network device 108c recognizes the received message as a Resv message and, accordingly, passes it to the RSVP engine 316 for processing, as indicated at block 418. The RSVP engine 316 first searches its table 600a to identify the matching entry 626b for this Resv message, as indicated at block 420 (FIG. 4B), and upon locating the matching entry 626b, the RSVP engine 316 computes or derives a logical session group ID for this reservation request, as indicated at block 422.

At decision block 424, the RSVP engine 316 determines if a shared reservation class is specified in the Resv message, i.e., the style object 570 in the Resv message style object 570 specifies sharing. Since sharing was not specified, as stated above, the RSVP engine 316 follows NO arrow 425 and proceeds to block 432 (FIG. 4C).

At block 432, the RSVP engine 316 searches the table 600a and locates all other entries in the table whose session group identifier (SGID) 614 matches the SGID that was derived from the matching entry at step 422. At decision block 433, the RSVP engine 316 determines if any additional matching entries were found. Because the same resource ID value, i.e., "42578", was used in the previous Path message 500 from voice agent 102a to voice agent 102d, there will be at least one matching entry. In response to detecting a matching entry, intermediate network device 108c selects the YES path of decision block 433 and progresses to decision block 434.

At decision block 434, device 108c searches table 600a and determines if any of the previously found matching entries is already sharing resources using the shared class method with another session that has a different session group ID. Assuming that no matching entry is already sharing resources using the shared class method, the NO path 435 is taken and device 108c proceeds to block 446 (FIG. 4D).

At this point, the intermediate network device 108c considers the two sessions from voice agent 102a (i.e., the traffic flow to voice agent 102d and the traffic flow to voice agent 102c) to belong to the same group. At block 446, the entry 626b and all other matching entries are preferably marked to indicate they are sharing resources using the SGID method. Further, since no additional resources need be reserved, RSVP entity 316 does not perform admission control on the reservation request, as indicated at block 448.

Once it has been established that the correct amount of resources are available, RSVP entity 316 directs the packet/frame classification engine 318 to identify received traffic, i.e., packets, matching the criteria contained in the Resv message from voice agent 102c, such as the filter spec and session objects, as indicated at block 450, and directs the traffic scheduler 304 to apply the resources previously reserved for the traffic flow from voice agent 102a to voice agent 102d to be applied to this traffic flow, i.e., to the traffic flow from voice agent 102a to voice agent 102c, as indicated at block 452. Thus, the network resources reserved to support the session to voice agent 104a are shared with the session to voice agent 104c. Intermediate network device 108c then forwards the Resv message 590 to the next hop toward the sourcing entity, i.e., toward voice agent 102a, as indicated at block 454.

Now suppose, for example, a fourth party at voice agent 102b places a call to the third party at voice agent 102c while the third party is engaged with a call to the first party 102a. Further assume that voice agent 102c supports call waiting, thus enabling it to place a current party on hold while it answers a call from another party.

The party at voice agent 102b may dial a series of numbers at the analog voice telephone set 122b that correspond to the voice agent 102c. The call signaling entity 210 at voice agent 102b detects the start of call and notifies the RSVP entity 204 to generate a resource ID number, e.g., "726" and one or more Path messages, as described above and as indicated in blocks 402-406 (FIG. 4A). These Path messages are then forwarded towards voice agent 102c and processed by the intermediate network devices 108 creating entry 626c in table 600a (FIG. 6A), as set forth above and indicated in blocks 408-414.

On receiving the Path message 500, the voice agent 102c alerts the third party to the incoming call. In response, the third party places the first party 102a on hold and answers the incoming call from the fourth party 102b. The call signaling entity 210 at voice agent 102c detects the transition from the current call to the waiting call and directs the RSVP entity 204 to generate a Resv message to respond to the received Path message. Assuming the RSVP state machine 208 determines that the voice agent 102c can only talk to one of the first party 102a or the fourth party 102b and that the resource requirements set forth in the Path message can be satisfied using the resources allocated to support the call from the first party, the RSVP state machine 208 concludes that it can share resources allocated for the call to the first party 102a with the call to the fourth party 102b. The RSVP state machine 208 indicates this preference in the Resv message by setting the option vector field 579 of the style object 570 to indicate sharing. Preferably, the RSVP state machine 208 further sets the option vector field 579 to imply the SE style of sharing and adds the necessary filter spec objects 580 to represent the first and fourth parties 102a and 102b in the explicit set of senders. The remainder of the Resv message is initialized in a conventional manner as set forth above and the Resv message is then sent towards the sourcing entity 102b, as indicated in block 416.

The Resv message 590 travels hop-by-hop back to voice agent 102b following the same route used by the Path message 500. At each hop, the Resv message is processed by the respective intermediate network device 108. More specifically, the Resv message is initially received at device 108c. The packet/frame receiver transmitter object 302 of device 108c recognizes the received message as a Resv message and, accordingly, passes it to the RSVP engine 316 for processing, as indicated at block 418.

The RSVP engine 316 first searches its RSVP session table 600a (FIG. 6A) to identify the matching entry 626c for this Resv message, as indicated at block 420 (FIG. 4B). Upon locating the matching entry 626c, the RSVP engine 316 derives or computes a logical session group ID for this reservation request by concatenating the source address with the resource ID value from the cells corresponding to columns 602 and 604 of the matching entry, as indicated at block 422.

At decision block 424, the RSVP engine 316 determines if a shared reservation class is specified in the Resv message 590. More specifically, the RSVP engine 316 examines the option vector field 579 of the Resv message to determine if sharing is specified. Since sharing was specified in the Resv message, as stated above, the RSVP engine 316 follows the YES arrow and proceeds to block 426.

At block 426, the RSVP engine 316 locates those entries 626 in the table 600a (FIG. 6A) that could potentially share resources with the data flow represented in the Resv message 590 using the shared reservation class method. In the preferred embodiment, the SE style is specified in the Resv message, thus this step would preferably locate those entries 626 whose source address 602 matches the IP address 588 specified in one of the filter spec objects 580 of the Resv message. In another embodiment of the invention, the WF-style is specified, thus step would preferably locate those entries 626 whose destination address field 608 matches the destination address 558 specified in the Resv message. In the illustrated embodiment, this block locates entry 626b as it is the only entry whose source address and source port fields 602, 604 of entry 626b match the IP address and port 588, 589 specified in the filter object of the Resv message.

For each entry 626 located, the RSVP engine 316 examines the shared field 616 to determine if it is sharing resources using the SGID method, as indicated at decision block 428. Since the entry 626b is already sharing resources using the SGID with another data flow (e.g., the data flow represented by entry 626a) the RSVP engine 316 concludes that resources cannot be shared and device 108c follows the YES arrow to decision block 436 (FIG. 4C) to perform admission control.

At decision block 436, the RSVP engine 316 performs admission control on the reservation request. Assuming the reservation represented by the received Resv message 590 passes admission control, the RSVP engine 316 then instructs the packet/frame classification engine 318 to identify received traffic, i.e., packets, matching the criteria contained in the Resv message, such as the filter spec and session spec objects, as indicated at block 438, and directs the traffic scheduler 304 to apply the necessary resources to received traffic matching that criteria to meet the bandwidth requirements contained in the Resv message, as indicated at block 440. Using the stored previous hop address from the matching entry 626c of its table 600a, intermediate device 108c then forwards the Resv message to the next hop toward the sourcing entity, i.e., toward voice agent 102b, as indicated at block 442.

The above described processing of the Resv message is preferably repeated at each intermediate device 108 along the route from voice agent 102c to voice agent 102b. At this point resources are reserved along the entire route from voice agent 102c to voice agent 102b to support the data flow containing voice information from voice agent 102b to voice agent 102c.

Now suppose, for example, that no prior RSVP data flows have been established in the network 100 when a first party at voice agent 102a places a call to a second party at voice agent 102d. Following the procedure, set forth above, a RSVP data flow is established between the two voice agents 102a, 102d and the resources necessary to support the traffic flow between voice agent 102a and 102d have been reserved. Further assume that the data flow has been assigned a resource ID value of "42578" by voice agent 102a and that the entry in the RSVP session table 600b (FIG. 6B) associated with the data flow is entry 626d.

At this point, suppose that a third party at voice agent 102b places a call to the second party at voice agent 102d and the second party 102d places the first party 102a on hold and answers the call from 102b. A data flow is then established between voice agent 102b and voice agent 102d in the manner as set forth above. Further assume that this data flow has been assigned a resource ID value of "500" by voice agent 102b and is represented in the table 600b as entry 626e.

Now suppose the first party at voice agent 102a calls a fourth party at voice agent 102c. The first party 102a places the second party 102d on hold and dials a series of numbers corresponding to voice agent 102c. Specifically, the call signaling entity 210 at voice agent 102a detects the start of call and determines that it can only talk to one of the second party 102d or fourth party 102c and concludes that it can share resources that have already been reserved for the data flow between it and the second party. In particular, call signaling entity 210 directs RSVP entity 204 to re-use the same resource ID, i.e., "42578", that was established for the traffic flow to voice agent 102d in the Path message to be transmitted to voice agent 102c. The Path message is then forwarded towards the destination entity, i.e., voice agent 102c, as indicated in block 408 (FIG. 4A).

At each intermediate network device 108 along the path between voice agent 102a and voice agent 102c, the Path message is processed as set forth above, entry 626f in table 600b is created in response to the Path message and the Path message is passed towards the voice agent 102c, as indicated by blocks 410-414.

The Path message is received by voice agent 102c and the destination entity 102c responds to the Path message by generating a Resv message 590. Specifically, the RSVP entity 204 at voice agent 104c initializes the header and session objects 502, 508 of the Resv message in a conventional manner. In addition, since voice agent 102c is not currently engaged in any data flows that it can share resources with, it concludes there are no RSVP resources to share and therefore does not specify sharing in the style object 570 that is included in the Resv message. The Resv message is then forwarded towards the sourcing entity 102a as indicated in block 416.

The Resv message is received at intermediate network device 108b and sent to the RSVP engine 316 for processing as indicated in step 418. Specifically, the RSVP engine 316 searches the session table 600b (FIG. 6B) for matching entry 626f and derives a session group ID from the matching entry 626f, as indicated in blocks 420, 422 (FIG. 4B). Since the style object in the Resv message does not indicate sharing, at decision block 424, the device 108b follows the NO arrow to block 432 (FIG. 4C).

At decision block 432 the device 108b searches the session table 600 to locate the those entries whose session group ID matches the derived session group ID. Specifically, the device 108b locates the session table entry 626d corresponding to the call between the first party 102a and the second party 102d as its session group ID matches the derived session group ID. At decision block 433, since a matching entry has been found, i.e., entry 626d, the device 108b follows the YES arrow and proceeds to decision block 434.

At decision block 434, device 108b examines the shared field 616 of the matching entry 626d and determines that the data flow associated with entry 626d is already sharing resources using the shared class method, thus, device 108b concludes that it cannot share resources using the SGID method and follows the YES arrow to decision block 436 to perform admission control.

At decision block 436, the RSVP engine 316 performs admission control on the reservation request. Assuming the reservation represented by the received Resv message passes admission control, the RSVP engine 316 then instructs the packet/frame classification engine 318 to identify received traffic, i.e., packets, matching the criteria contained in the Resv message, such as the filter spec and session spec objects, as indicated at block 438, and directs the traffic scheduler 304 to apply the necessary resources to received traffic matching that criteria to meet the bandwidth requirements contained in the Resv message, as indicated at block 440. In other words, the RSVP engine 316 reserves sufficient resources to support the timing requirements of the session from voice agent 102a to voice agent 102c.

Using the stored previous hop address from the matching entry 626f of its table 600b, intermediate device 108b then forwards the Resv message to the next hop toward the sourcing entity, i.e., toward voice agent 102a, as indicated at block 442. If in response to decision block 436, the reservation fails admission control, the RSVP message generator 322 formulates a reservation error (ResvErr) message and sends it back toward the destination/receiving entity, i.e., voice agent 102c, as indicated at block 444 (FIG. 4D).

The above described processing of the Resv message is preferably repeated at each intermediate device 108 along the route from voice agent 102a to voice agent 102c. At this point resources are reserved along the entire route from voice agent 102a to voice agent 102d (e.g., at routers 108a, 108b, 108c and 108d) to support the data (traffic) flow containing voice information from voice agent 102a to voice agent 102c.

It should be understood that the RSVP engines 316 of the intermediate network devices may also confirm that resources have already been reserved and assigned to the matching traffic flow before determining that the two sessions may share the same resources. If resources have not yet been reserved to the prior session, then the RSVP engines 316 perform admission control and reserve resources for the subsequent session in a conventional manner. Furthermore, if the resources required by the new session exceed those currently allocated to the prior session, then the incremental resources need to be reserved. In this case, admission control is required.

It should be understood that voice agents 102a-d periodically issue Path and Resv messages in order to refresh the soft states maintained by the state machine engines 324 of the network devices. The Path messages used to refresh RSVP state preferably contain the same resource ID used in the first Path message for the respective session. Accordingly, each voice agent 102a-d preferably stores the resource IDs in use by them.

Intermediate network devices that have not been configured to recognize the resource ID object 510 simply process the Path messages containing such objects in a conventional manner. That is, these legacy devices look for entries matching the session ID of received Resv messages and do not share resources among different sessions, even if those sessions will not be transmitting traffic at the same time.

It should further be understood that the present invention can be used with other reservation or signaling protocols besides RSVP. For example, the present invention can be advantageously used with ATM signaling protocols, such as Q.2931.

It should be further understood that the resource ID generator 212 may be disposed at or otherwise be accessible to the call signaling entity 210. In this case, the call signaling entity 210 would generate the resource ID and pass it to the RSVP entity 204 for use in RSVP reservation requests. The resource ID values could also be alphanumeric strings or other locally unique values.

It should also be understood that the present invention can be implemented with is other voice agents, such as personal computers (PCs) running one or more communication applications that include RSVP support, such as NetMeeting from Microsoft Corp. of Redmond, Wash. and/or Intel Internet Phone from Intel Corp. of Santa Clara, Calif. VoIP or Internet telephones may also be used as voice agents in the manner described herein.

Also, it should be understood that the voice traffic described herein may be exchanged between multimedia terminal adapters coupled to cable modems, which, in turn, are connected to a cable network. In this case, the corresponding multimedia terminal adapters (MTAs) would generate the Path messages containing the resource ID objects 510.

The foregoing description has been directed to specific embodiments of this invention. It will be apparent, however, that other variations and modifications may be made to the described embodiments, with the attainment of some or all of their advantages. For example, the present invention can be used with other time-sensitive or high bandwidth traffic flows besides voice, such as video or multimedia traffic flows. Therefore, it is an object of the appended claims to cover all such variations and modifications as come within the true spirit and scope of the invention.

What is claimed is:

1. A device comprising:
   a traffic scheduler having one or more resources for use in forwarding network traffic received at the device at different rates;
   a classification engine configured to identify received network traffic based upon predefined criteria; and
   a resource reservation engine in communicating relationship with the traffic scheduler and the classification engine,
   wherein, in response to a request to reserve resources for a first data flow associated with a first session group identifier (ID) and belonging to a first session, the resource reservation engine is configured to,
      determine that the session group ID of the first data flow matches the session group ID of one or more second data flows, check if the one or more second data flows are already sharing resources with a third data flow having a session group ID that differs from the first session group ID, if so, direct the traffic scheduler to prevent resources reserved for the one or more second data flows from being shared with the first data flow, and if not, direct the traffic scheduler to share resources reserved for the one or more second data flows with the first data flow.

2. The device of claim 1 wherein the resource reservation engine includes a data structure for storing information associated with the data flows.

3. The device of claim 2 wherein the information includes a shared field that indicates a method in which resources are shared.

4. The device of claim 1 wherein the session group identifier associated with a given data flow includes a source address of an entity sourcing the traffic flow of the given data flow and a resource identifier (ID).

5. The device of claim 1 wherein:
the resource reservation engine utilizes the Resource reSerVation Protocol (RSVP) specification standard; and
the session group ID of a given data flow is contained in a RSVP Path message associated with the given data flow.

6. The device of claim 1 wherein the first data flow and the one or more second data flows carry voice information.

7. The device of claim 1 wherein the first data flow and the one or more second data flows originate from a single sourcing entity.

8. The device of claim 1 wherein the first data flow and the one or more second data flows originate from a single sourcing entity and are directed to two or more different destination entities.

9. The device of claim 1 wherein the first data flow and the one or more second data flows carry voice information and correspond to a call waiting context.

10. The device of claim 1 wherein in response to a request to reserve resources for the first data flow that specifies sharing and a set of senders, the resource reservation engine is configured to direct the traffic scheduler to share resources reserved for one or more second data flows that are associated with the set of senders with the first data flow provided that none of the second data flows are sharing resources with a third data flow belonging to a session that is different than the first session.

11. The device of claim 10 wherein the set of senders is an explicit list of senders included in the request.

12. The device of claim 10 wherein:
the resource reservation engine is configured to utilize the Resource reSerVation Protocol (RSVP); and
the request includes a shared object that specifies the Shared Explicit (SE) style of sharing.

13. The device of claim 10 wherein the set of senders includes those senders associated with data flows whose destination address matches a destination address of the first data flow.

14. The device of claim 10 wherein:
the resource reservation engine is configured to utilize the Resource reSerVation Protocol (RSVP); and
the request includes a shared object that specifies the Wildcard Filter (WF) style of sharing.

15. A device comprising:
a traffic scheduler having one or more resources for use in forwarding network traffic;
a resource reservation engine configured to;

determine that a first session group ID of a new data flow matches a second session group ID of one or more existing data flows, check if the one or more existing data flows are already sharing resources with another data flow that has a third session group ID different from the first session group ID, and if so, direct the traffic scheduler to prevent resources reserved for one or more existing data flows from being shared with the new data flow, and if not, direct the traffic scheduler to share resources reserved for one or more existing data flows with the new data flow.

16. The device of claim 15 wherein the first, second, and third session group ID each comprise a source address of an entity sourcing the data flow and a locally unique resource identifier (ID).

17. The device of claim 15 wherein the resource reservation engine is configured to direct the traffic scheduler to share resources in response to a Resv message configured according to Resource reSerVation Protocol (RSVP).

18. The device of claim 15 wherein the resource reservation engine is configured to, in response to a request to reserve resources for a new data flow that specifies sharing and a set of senders, direct the traffic scheduler to share resources reserved for one or more existing data flows that are associated with the set of senders with the new data flow, provided that none of the existing data flows are sharing resources with another data flow belonging to a session that is different than the first session.

19. The device of claim 15 wherein the resources comprise priority queues.

20. A method comprising:
receiving a request for a new data flow, the new data flow associated with a first session group (ID);
determining that the first session group ID of the new data flow matches a second session group ID of one or more existing data flows;
checking if the one or more existing data flows are already sharing resources with another data flow that has a third session group ID different from the first session group ID;
if so, preventing resources reserved for the one or more existing data flows from being shared with the new data flow; and
if not sharing resources reserved for the one or more existing data flows with the new data flow.

21. The method of claim 20 wherein the first, second, and third session group ID each comprise a source address of an entity sourcing the data flow and a locally unique resource identifier (ID).

22. The method of claim 20 wherein the request for a new data flow is a Resv message configured according to Resource reSerVation Protocol (RSVP).

23. The method of claim 20 further comprising:
receiving a request to reserve resources for the new data flow that specifies sharing and a set of senders;
ascertaining that none of the existing data flows are sharing resources with another data flow belonging to a session that is different than the first session; and
in response to the step of ascertaining, sharing resources reserved for one or more existing data flows that are associated with the set of senders with the new data flow.

24. The method of claim 20 wherein the resources comprise priority queues.

25. An apparatus comprising:
means for receiving a request for a new data flow, the new data flow associated with a first session group (ID);

means for determining that the first session group ID of the new data flow matches a second session group ID of one or more existing data flows;

means for checking if the one or more existing data flows are already sharing resources with another data flow that has a third session group ID different from the first session group ID;

means for preventing resources reserved for the one or more existing data flows from being shared with the new data flow if so; and means for sharing resources reserved for one or more existing data flows with the new data flow if not.

* * * * *

UNITED STATES PATENT AND TRADEMARK OFFICE
CERTIFICATE OF CORRECTION

PATENT NO. : 7,454,504 B2  
APPLICATION NO. : 11/584854  
DATED : November 18, 2008  
INVENTOR(S) : Michael V. DiBiasio Page 1 of 1

It is certified that error appears in the above-identified patent and that said Letters Patent is hereby corrected as shown below:

Col. 15, Line 9, please replace "locate the those" with "locate those"

Col. 16, Line 27, please replace "implemented with is other" with "implemented with other"

Col. 17, Line 67, please replace "engine configured to;" with "engine configured to:"

Col. 18, Line 38, please replace "are a lready" with "are already"

Signed and Sealed this  
Twenty-second Day of March, 2011

David J. Kappos  
*Director of the United States Patent and Trademark Office*